UNITED STATES PATENT OFFICE.

OSKAR HINSBERG, OF BARMEN, ASSIGNOR TO THE FARBENFABRIKEN, VORMALS FR. BAYER & CO., OF ELBERFELD, GERMANY.

PHENACETINE.

SPECIFICATION forming part of Letters Patent No. 400,086, dated March 26, 1889.

Application filed June 29, 1888. Serial No. 278,593. (Specimens.)

*To all whom it may concern:*

Be it known that I, OSKAR HINSBERG, a citizen of the Empire of Germany, residing at Barmen, in the said Empire, have invented a useful Improvement in the Manufacture of a New Pharmaceutical Product, of which the following is a specification.

My invention relates to the production of a new pharmaceutical product, a new antipyretic and antineuralgic, obtained by reducing nitrophenetole and melting the phenetidinchlorhydrate thus formed with dried sodium acetate and acetic acid.

In carrying out my process practically I proceed as follows: Fifty kilos of the potassium salt of paranitrophenole are mixed with three hundred kilos of alcohol, adding forty kilos of bromaethyl. The mixture is heated in an autoclave at a pressure of three to four atmospheres during about eight hours. At this time the reaction is finished, whereby paranitrophenole is obtained according to the following equation:

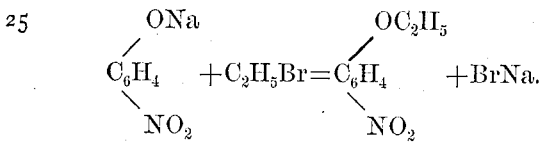

In order to separate the mononitrophenole, which has not taken any part in the process, from the ether recently formed, the solution is treated with steam. By this operation the ether distills, leaving behind the paramononitrophenole.

For the reduction of the paranitrophenetole forty kilos of this ether are mixed with sixty kilos of muriatic acid and sixty kilos of water. To this mixture are gradually added, at a temperature of 70° centigrade, twenty-five kilos of iron filings, the whole being stirred continually. As soon as the ether is entirely reduced, para-amidophenetole is obtained, as explained by the following equation:

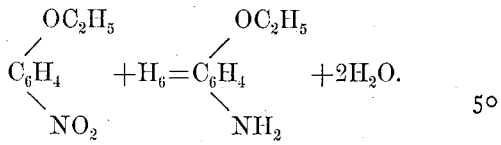

The solution obtained in this manner is saturated with chalk diluted with water, and for the purification of the amido compound treated with steam the distillate is absorbed in water acidulated by muriatic acid. The muriatic salt of the para-amidophenetole crystallizes in white leaves. Fifty kilos of this product are melted with one molecule of melted acetate of sodium and twenty-four kilos of glacial acetic acid. The melted mass is repeatedly boiled with water and the new monoacetylparamidophenetole obtained from the filtrates after cooling. It has the following chemical formula:

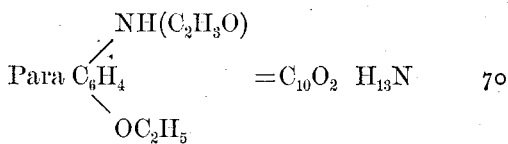

and is obtained according to the following equation:

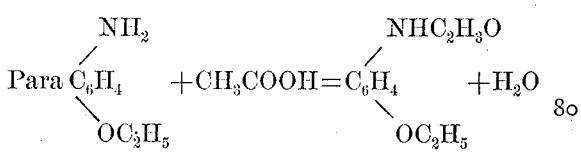

The monoacetylparamidophenetole crystallizes in white leaves, melting at 133° to 136° centigrade. It is tasteless, little soluble in cold water, more so in hot water, but easily in alcohol, chloroform, benzole, &c. It is altogether different from the body described in the *Year Book of Pharmacy*, 1883, page 146, denominated "phenacetëine." The formula of phenacetëine is $C_{10}H_{12}O_2$, that of phenacetine $C_{10}H_{13}O_2N$, my product containing nitrogen contrary to phenacetëine. The phenacetëine represents a coloring-matter, an amorphous carmine-red powder, the acid solution of which is yellow, the alkaline raspberry red, while my phenacetine is colorless, crystallizing in white leaves, not changing color by addition of acids or alkalies.

Having thus described my invention, what I claim as new, and desire to secure by Letters Patent, is—

The product herein described, which has the following characteristics: it crystallizes in white leaves, melting at 135° centigrade; not coloring on addition of acids or alkalies; is little soluble in cold water, more so in hot water; easily soluble in alcohol, ether, chloroform, or benzole; is without taste, and has the general composition $C_{10}H_{13}O_2N$.

O. HINSBERG.

Witnesses:
WM. DIESTEL,
O. J. HEIMPEL.